No. 782,869. PATENTED FEB. 21, 1905.
A. H. NEUREUTHER.
MACHINE FOR MANUFACTURING AND MOUNTING PINIONS AND WHEELS.
APPLICATION FILED MAY 20, 1904.

13 SHEETS—SHEET 1.

No. 782,869. PATENTED FEB. 21, 1905.
A. H. NEUREUTHER.
MACHINE FOR MANUFACTURING AND MOUNTING PINIONS AND WHEELS.
APPLICATION FILED MAY 20, 1904.

12 SHEETS—SHEET 2.

No. 782,869. PATENTED FEB. 21, 1905.
A. H. NEUREUTHER.
MACHINE FOR MANUFACTURING AND MOUNTING PINIONS AND WHEELS.
APPLICATION FILED MAY 20, 1904.

12 SHEETS—SHEET 3.

Witnesses:

Inventor:
Andrew H. Neureuther
by Parker & Carter
Attys.

No. 782,869. PATENTED FEB. 21, 1905.
A. H. NEUREUTHER.
MACHINE FOR MANUFACTURING AND MOUNTING PINIONS AND WHEELS.
APPLICATION FILED MAY 20, 1904.
13 SHEETS—SHEET 5.

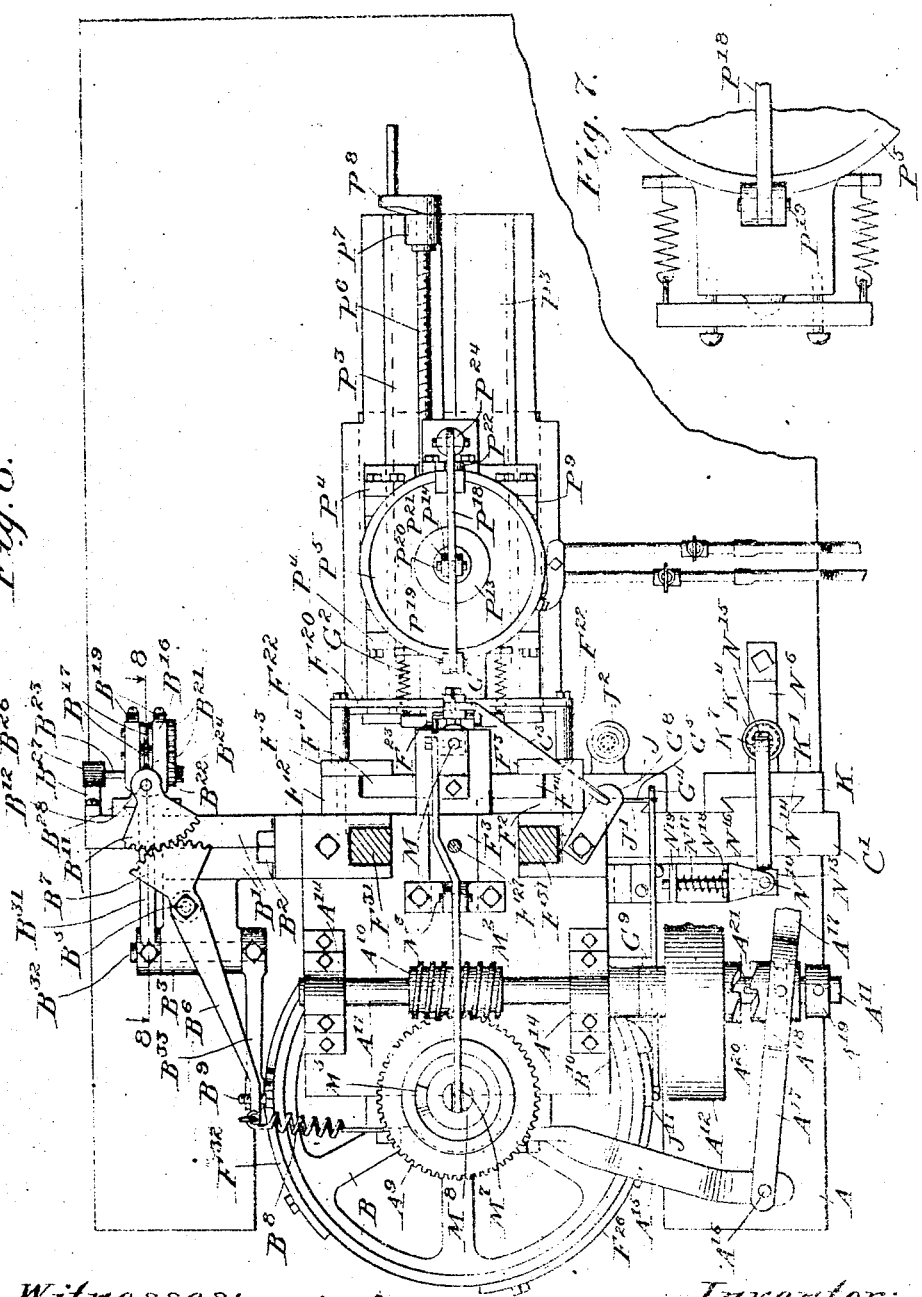

No. 782,869. PATENTED FEB. 21, 1905.
A. H. NEUREUTHER.
MACHINE FOR MANUFACTURING AND MOUNTING PINIONS AND WHEELS.
APPLICATION FILED MAY 20, 1904.
12 SHEETS—SHEET 7.
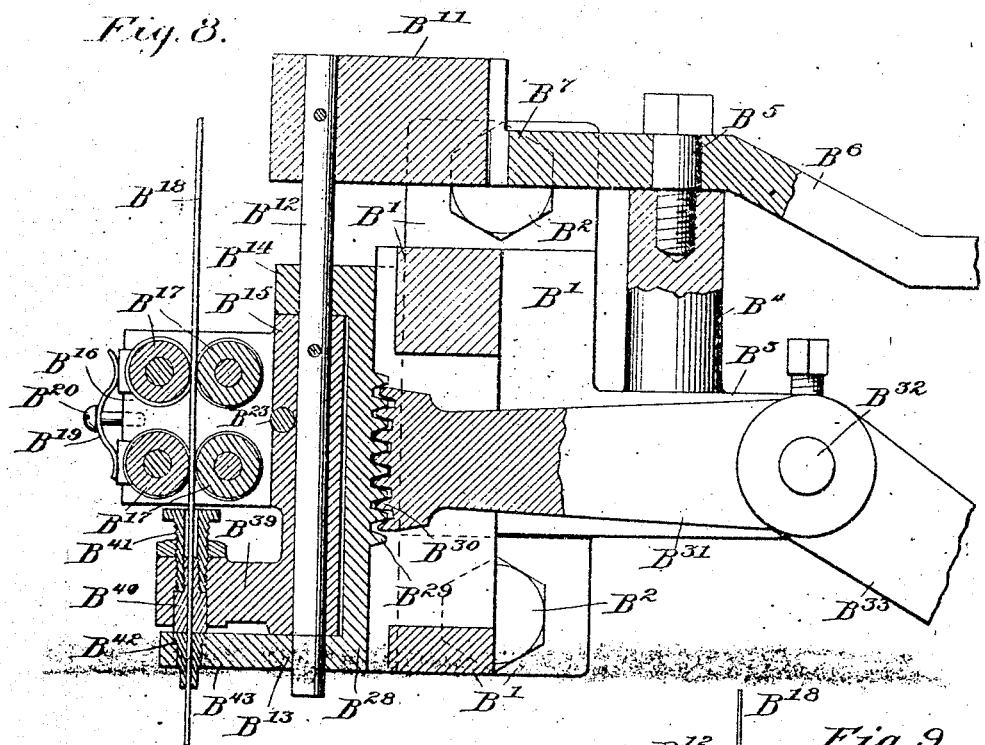
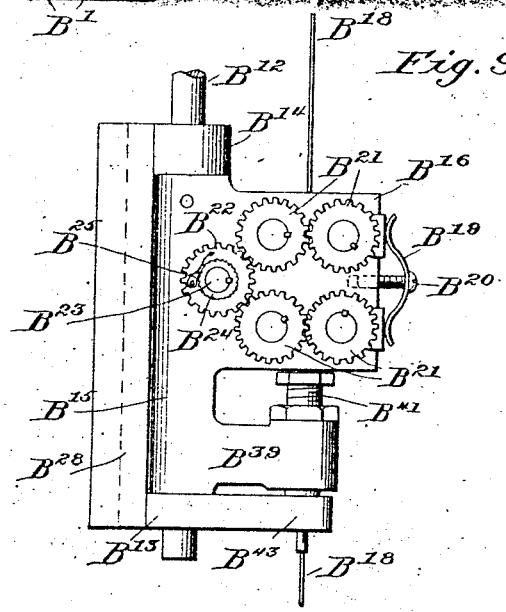
Witnesses: Inventor:
Andrew H. Neureuther
by Parker Carter
attys No. 782,869. PATENTED FEB. 21, 1905.
A. H. NEUREUTHER.
MACHINE FOR MANUFACTURING AND MOUNTING PINIONS AND WHEELS.
APPLICATION FILED MAY 20, 1904.
12 SHEETS—SHEET 8.
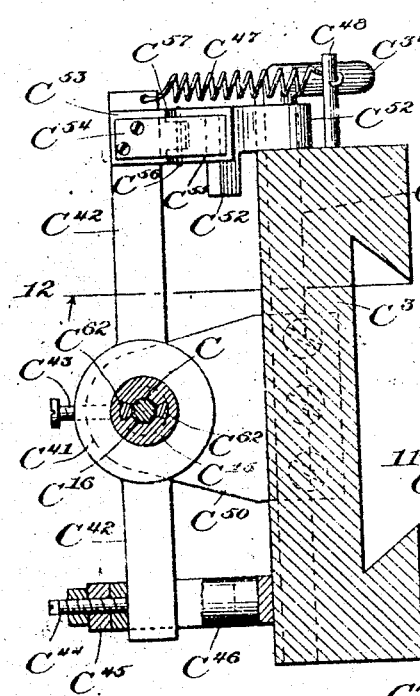
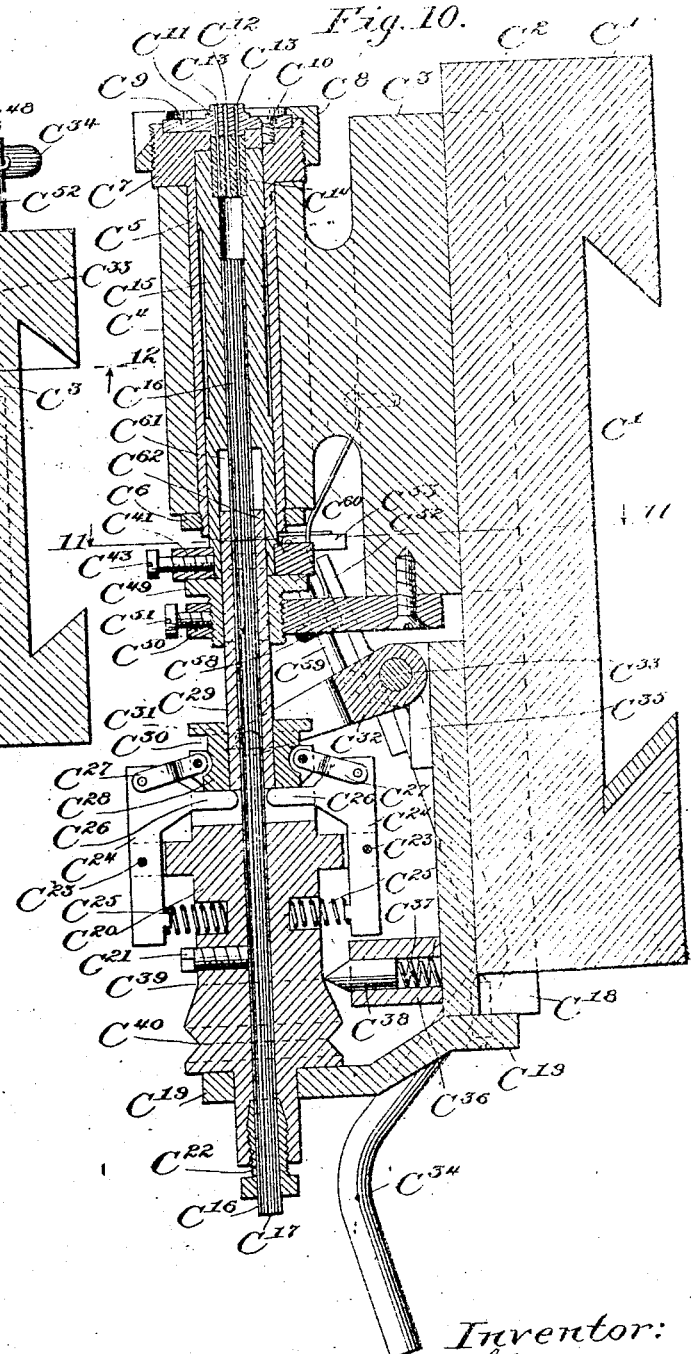
Witnesses:
Inventor:

No. 782,869. PATENTED FEB. 21, 1905.
A. H. NEUREUTHER.
MACHINE FOR MANUFACTURING AND MOUNTING PINIONS AND WHEELS.
APPLICATION FILED MAY 20, 1904.

12 SHEETS—SHEET 9.

No. 782,869. PATENTED FEB. 21, 1905.
A. H. NEUREUTHER.
MACHINE FOR MANUFACTURING AND MOUNTING PINIONS AND WHEELS.
APPLICATION FILED MAY 20, 1904.
12 SHEETS—SHEET 10.
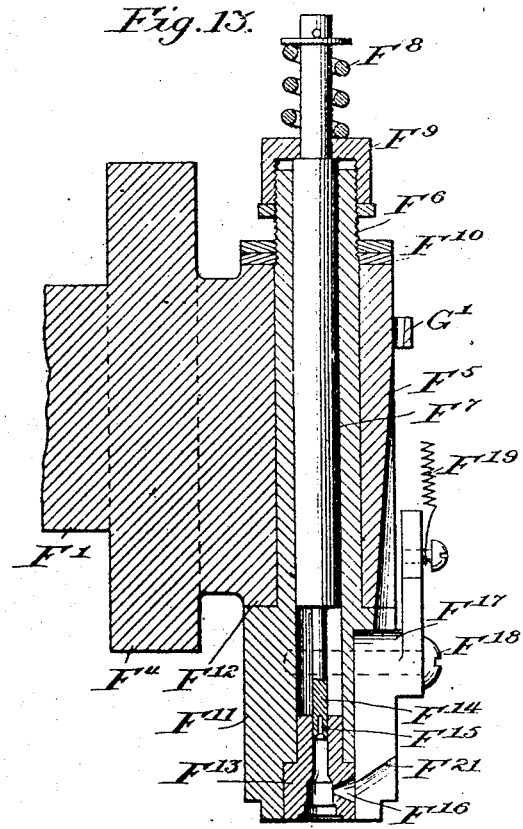
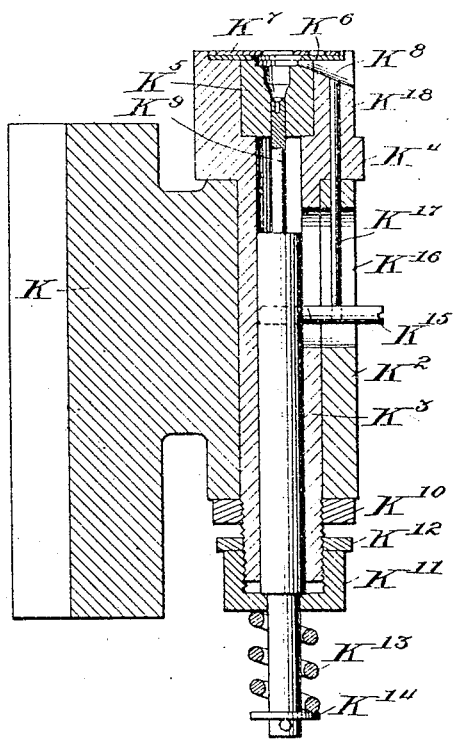
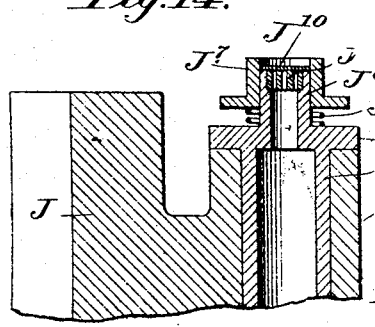
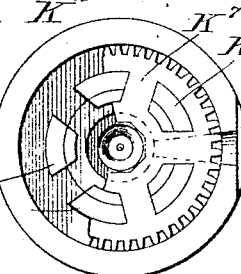
Witnesses:
Inventor:
Andrew H. Neureuther

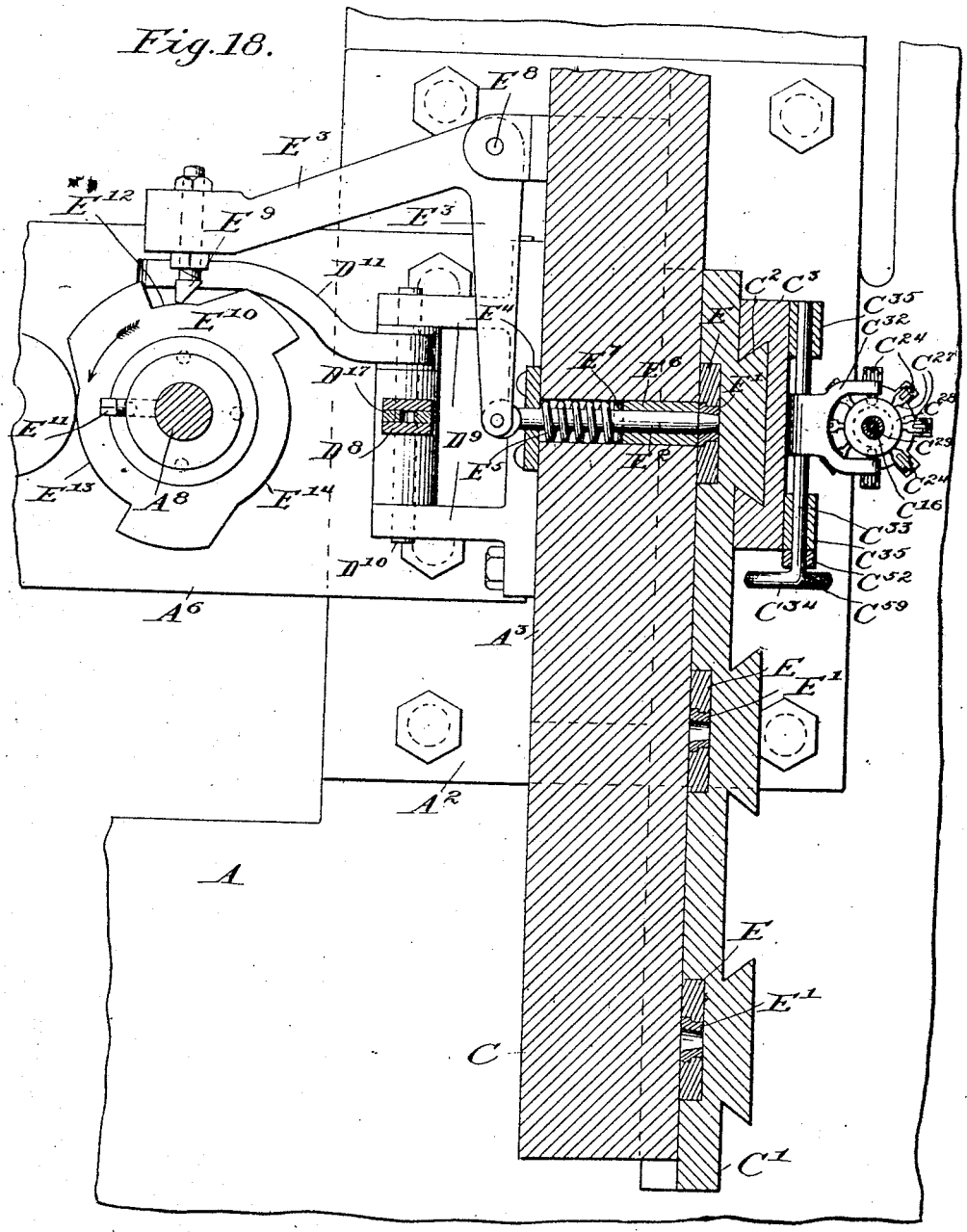

No. 782,869. PATENTED FEB. 21, 1905.
A. H. NEUREUTHER.
MACHINE FOR MANUFACTURING AND MOUNTING PINIONS AND WHEELS.
APPLICATION FILED MAY 20, 1904.

12 SHEETS—SHEET 12.

Witnesses:

Inventor:
Andrew H. Neureuther
by Parker Carter
Attys

No. 782,869.

Patented February 21, 1905.

UNITED STATES PATENT OFFICE.

ANDREW H. NEUREUTHER, OF PERU, ILLINOIS, ASSIGNOR TO THE WESTERN CLOCK MANUFACTURING COMPANY, OF LASALLE, ILLINOIS, A CORPORATION OF ILLINOIS.

MACHINE FOR MANUFACTURING AND MOUNTING PINIONS AND WHEELS.

SPECIFICATION forming part of Letters Patent No. 782,869, dated February 21, 1905.

Application filed May 20, 1904. Serial No. 208,840½.

*To all whom it may concern:*

Be it known that I, ANDREW H. NEUREUTHER, a citizen of the United States, residing at Peru, in the county of Lasalle and State of Illinois, have invented a certain new and useful Improvement in Machines for Manufacturing and Mounting Pinions and Wheels, of which the following is a specification.

My invention relates to a machine for forming pinions, particularly such as are produced from blanks, wires, and the like and molten metal used to bring the parts together and hold them in proper relation.

It is illustrated in the accompanying drawings, wherein—

Figure 1:
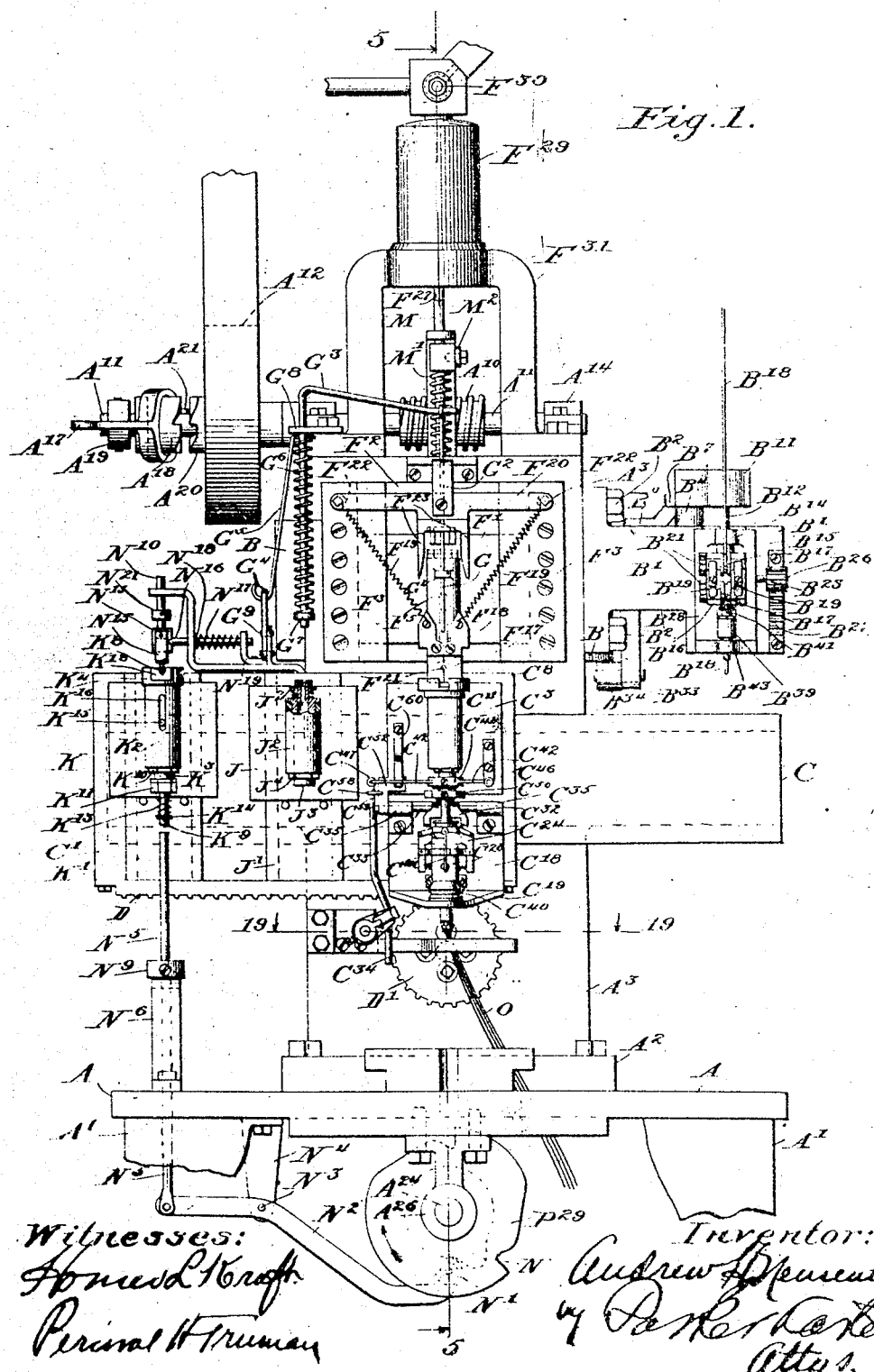
Figure 2:
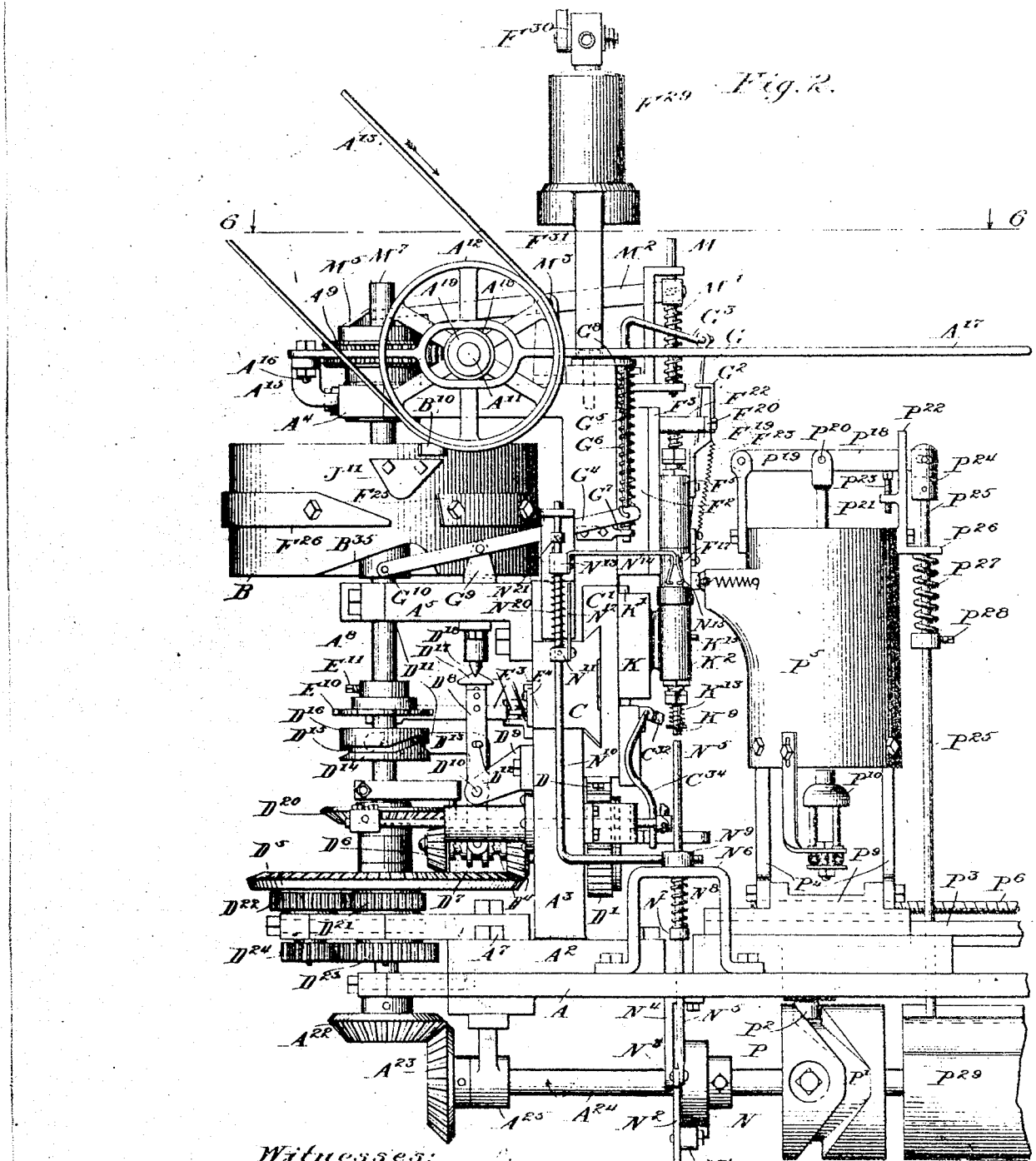
Figure 3:
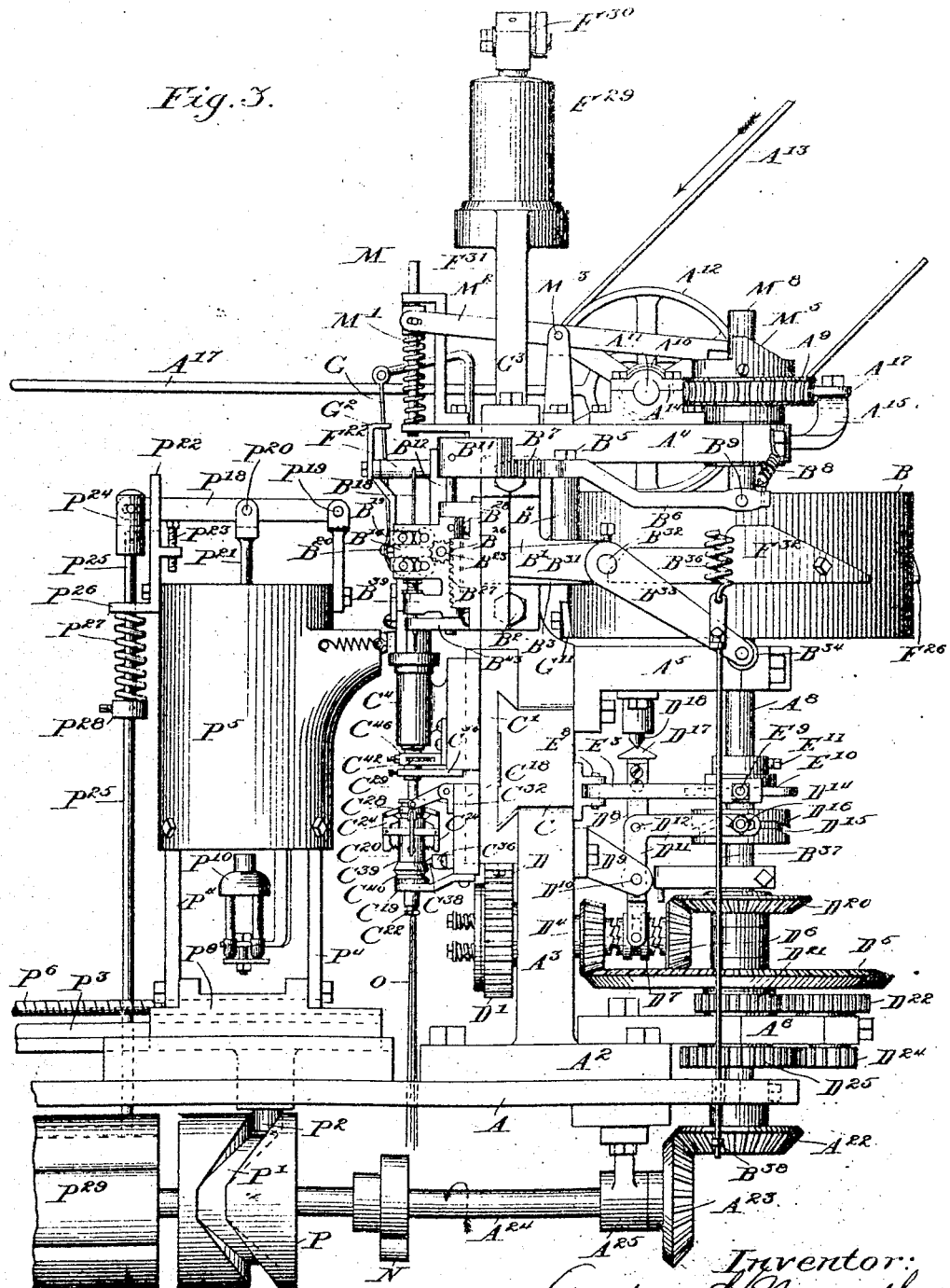
Figure 4:
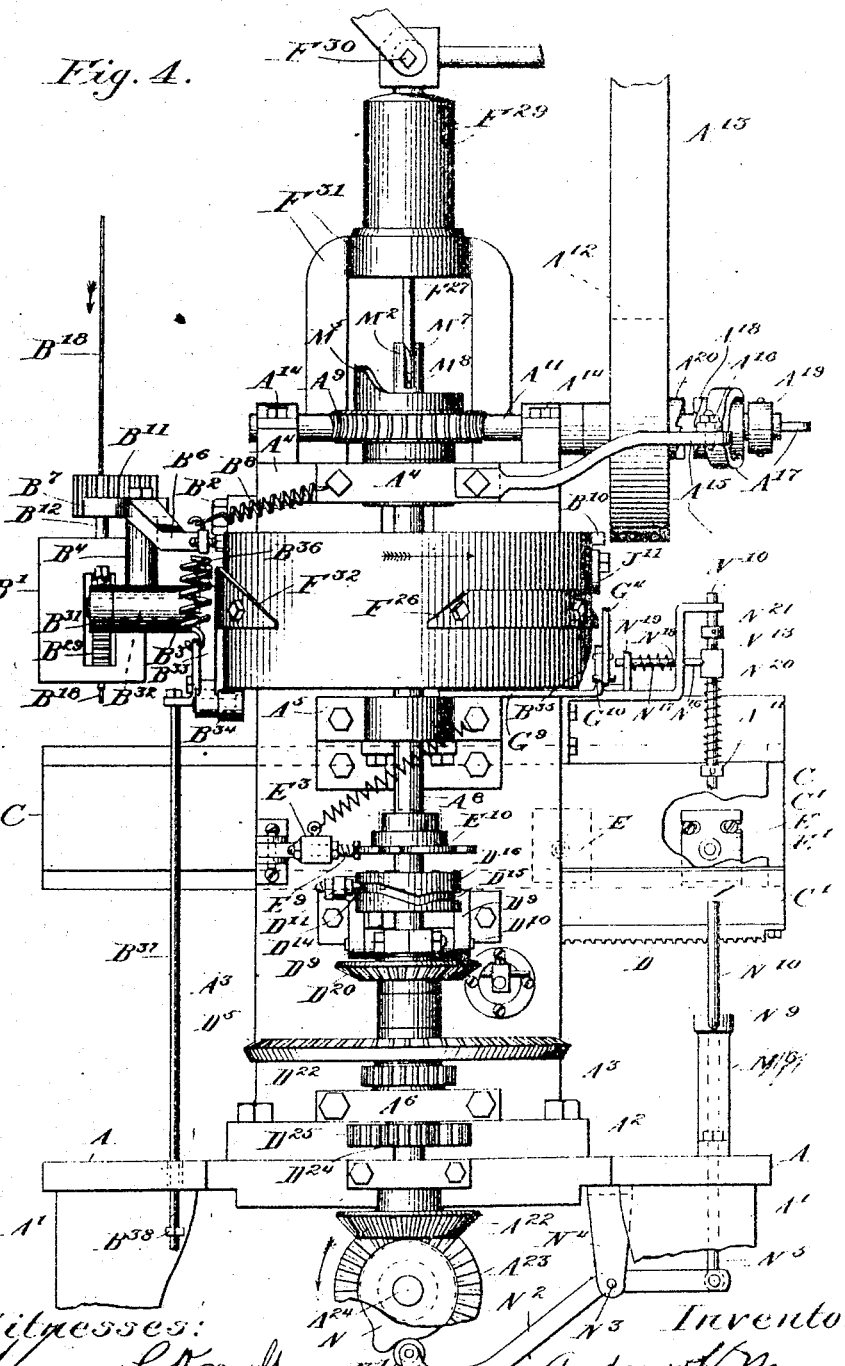
Figure 5:
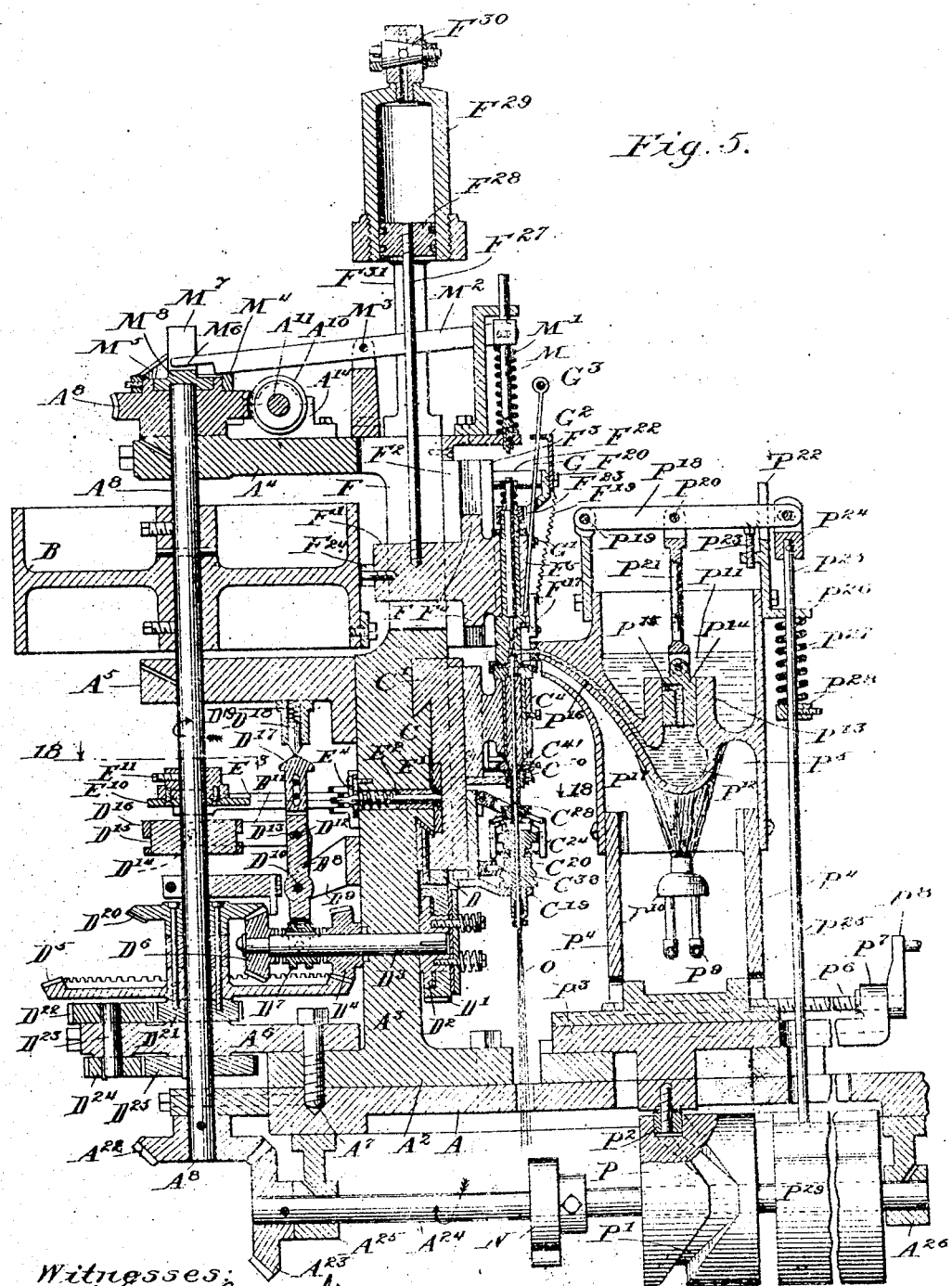
Figure 12:
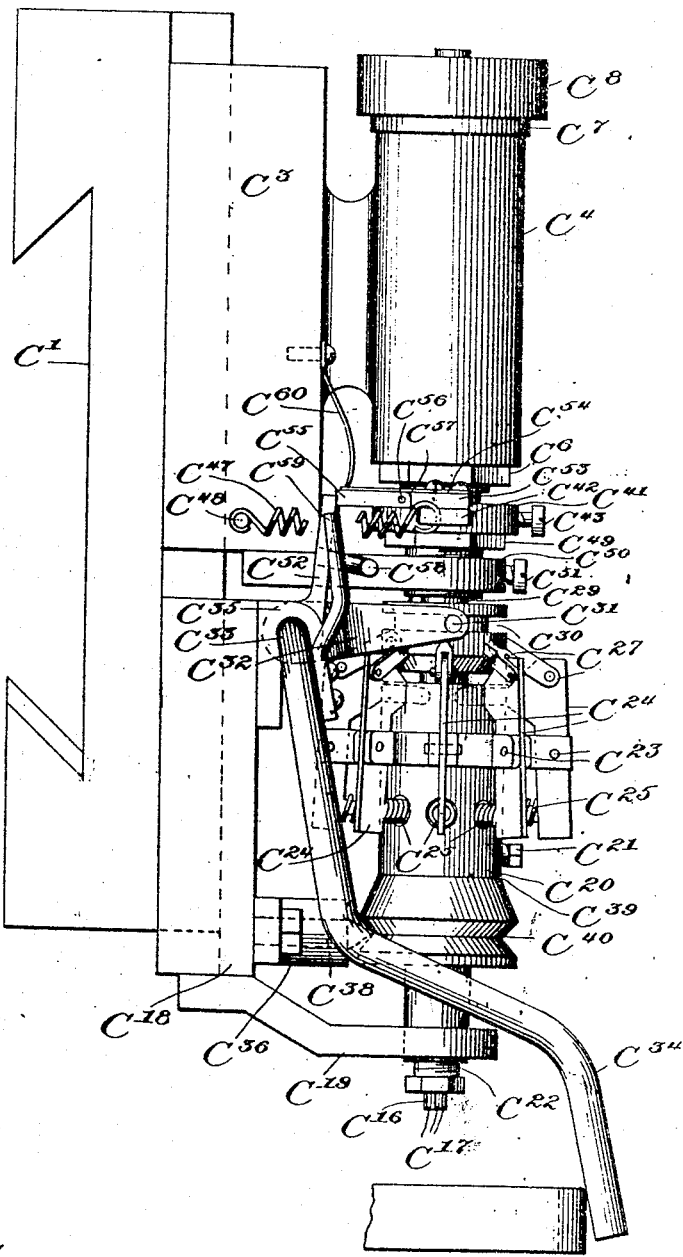
Figure 19:
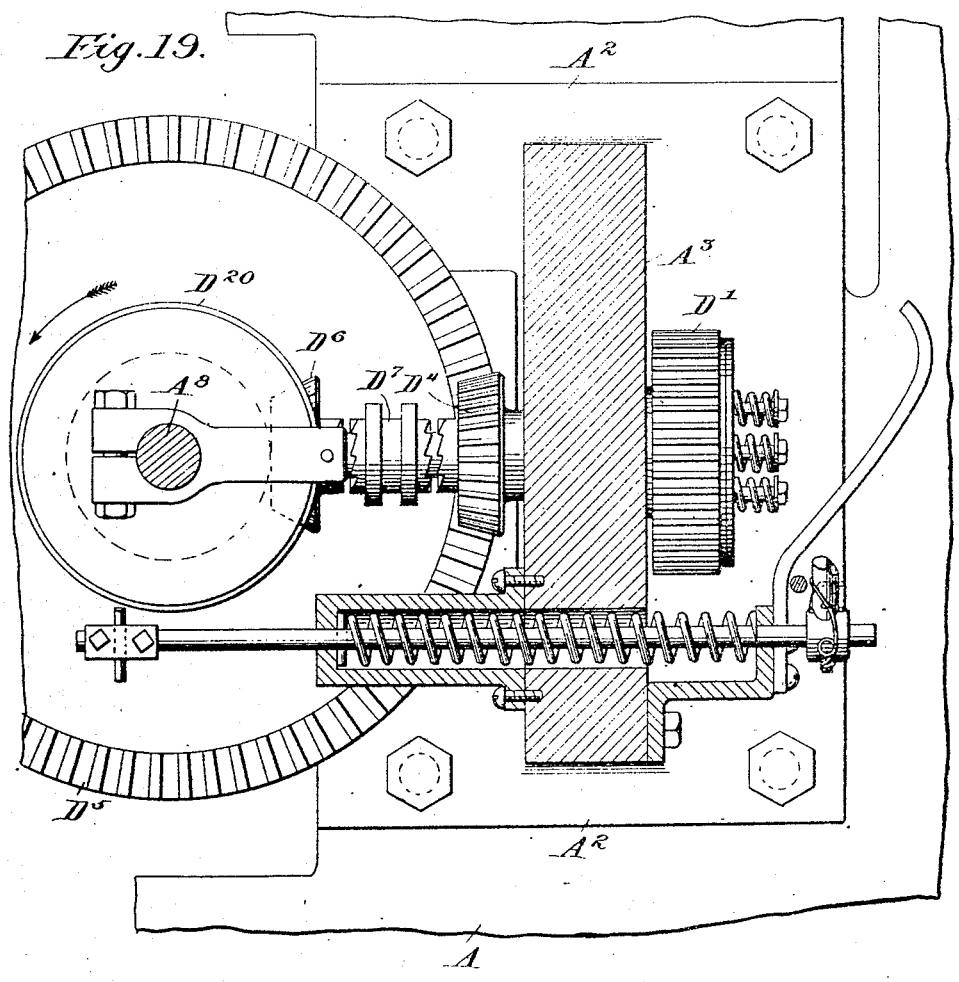
Figure 20:
Figure 21:
Figure 22:
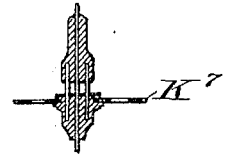

Figure 1 is a front view of the machine with the metal-pot removed from the table. Fig. 2 is a view looking from the left-hand side toward the machine as illustrated in Fig. 1 with the pot in position. Fig. 3 is a view looking from the right-hand side of the machine as illustrated in Fig. 1 with the pot in position. Fig. 4 is a rear elevation with parts slightly broken away. Fig. 5 is a section on the line 5 5 of Fig. 1. Fig. 6 is a plan view with part in section, taken on the line 6 6 of Fig. 2. Fig. 7 is an enlarged detail of the nozzle of the metal-pot. Fig. 8 is a section on the line 8 8 of Fig. 6, showing a detail of the pivot-wire feeding and cutting mechanism. Fig. 9 is a side elevation of a portion of said mechanism. Fig. 10 is an enlarged detail sectional view of the devices for feeding and cutting off the pinion-forming wires and is shown on a smaller scale as a part of Fig. 5. Fig. 11 is a section on the line 11 11 of Fig. 10. Fig. 12 is a side view of the same mechanism as that illustrated in Fig. 10, but taken from the left side as illustrated in Fig. 1. Fig. 13 is a detail cross-section view of the mold which unites the pinion and pivot wires before the gear-wheel is applied. Fig. 14 is a detail cross-section of the device for applying the zinc washer. Fig. 15 is a detail cross-sectional view of the device for holding and applying the gear-wheel. Fig. 16 is a cross-sectional view of a modification of the same. Fig. 17 is a plan view showing the gear-wheel as applied to such modification in Fig. 16. Fig. 18 is a horizontal section on the line 18 18 of Fig. 5 to illustrate the locking mechanism to hold the parts in their several positions. Fig. 19 is a horizontal section on the line 19 19 of Fig. 1. Figs. 20, 21, and 22 illustrate the pinion in three of its stages of manufacture.

Like parts are indicated by the same letter in all the figures.

A is a bed-plate, suitably mounted in any desired manner—as, for example, on the standards $A'$ $A'$. The plate or bed is of any convenient form to adapt it for conveniently holding the various portions of the apparatus. On this bed is placed a footing $A^2$, whence rises a standard $A^3$. This standard $A^3$ has an upper rearwardly-projecting part $A^4$, and it also has rearwardly projecting from it below said part $A^4$ the part $A^5$ and then the part $A^6$, which latter part is held in position by the bolts $A^7$. These three parts serve as bearings for the vertical shaft $A^8$, which carries a considerable portion of the driving mechanism. This shaft is driven by means of a worm-gear $A^9$, engaged by the worm $A^{10}$ on the shaft $A^{11}$, which carries the pulley $A^{12}$, driven by the belt $A^{13}$. The driving-shaft which carries the worm is mounted in suitable bearings $A^{14}$ on the rearwardly-projecting part $A^4$, above referred to. In order to control the movements of the driving-shaft $A^{11}$, which in turn operates the shaft $A^8$, a support $A^{15}$ is attached to the part $A^4$, and at its outer extremity $A^{16}$ is pivoted a movable arm $A^{17}$, which carries a sliding clutch-block $A^{18}$, adapted to move between the stop $A^{19}$ and the clutch-face $A^{20}$, associated with the pulley $A^{12}$. This arm can be manipulated to throw the pulley $A^{12}$, and therefore the shaft $A^{11}$, in and out of gear. The pulley is of course loose on the shaft and the clutch-block feathered in the slot $A^{21}$. On the lower end of the shaft $A^8$ is the bevel-gear $A^{22}$, which meshes with the bevel-gear $A^{23}$ on the horizontal shaft $A^{24}$. This shaft is mounted in hangers $A^{25}$ and $A^{26}$, depending from the bottom of the table A. These two shafts are thus mounted and adapted to impart motion to the several moving parts by means of the mechanism associated with them and hereinafter described.

The first detailed operation of the mechanism which I will describe is that portion which has to do with the feeding of the pivot or central wire down to the proper point, the delivery of one end of such wire to the mold-piece, the cutting off of a suitable length of wire to form the pivot, and the moving of the same forward to a point where it is to be brought into proper relation with the other parts which are to be assembled to make up the complete pinion.

On the shaft $A^8$ near the top is mounted the cam-wheel B, which carries various cam parts adapted to various purposes, as will be hereinafter from time to time described. Laterally projecting from the standard $A^3$ and near the top thereof is the frame-piece $B'$, held by the bolts $B^2 B^2$. This frame-piece $B'$ has a projecting part $B^3$, with a standard $B^4$ rising therefrom, on which is pivoted, by means of a pivot-pin $B^5$, the bent lever $B^6$, one end of which carries the segment-gear $B^7$, the other end of which is held toward the face of the cam-wheel B by means of a spring $B^8$, the other end of which is attached to the projection on the part $A^4$. In the end of this arm $B^6$ is the detachable bolt $B^9$, the head of which is placed in the path of the cam projection $B^{10}$ on the exterior surface of the cam-wheel B. As this projection passes under the head of the bolt the arm $B^6$ is moved and the segment-gear $B^7$ rocked. This gear is in engagement with the segment-gear $B^{11}$ on the rocking shaft $B^{12}$, which passes through bearings $B^{13}$ and $B^{14}$ and carries the inner tubular part $B^{15}$. From this part projects the frame $B^{16}$, which carries the rollers $B^{17} B^{17}$, between which travels the pivot-wire $B^{18}$. The two outer rollers are flexibly held against the inner rollers by means of the spring-bar $B^{19}$, which is kept in tension adjustably by the set-screw $B^{20}$. Each of these rollers is provided at its outer end with a gear-wheel $B^{21}$, which gear-wheels intermesh, as indicated, and two of which gear-wheels also intermesh with the gear-wheels $B^{22}$ on the shaft $B^{23}$. This shaft is provided with a ratchet $B^{24}$ and a spring and dog $B^{25}$, which prevents its rotation in one direction. At the other end of this shaft is a pinion $B^{26}$, meshing with a rack $B^{27}$. This rack could be held against the pinion by a spring action to accommodate the rack and pinion to the motion hereinafter to be described; but the same result can be made by suitably shaping the teeth in the pinion and the rack. The rack is rigid on the projecting portion of the frame-piece $B'$. The bearings $B^{13}$ and $B^{14}$ are formed in projections on the vertically-sliding part $B^{28}$, which slides upon a dovetailed projecting part on the frame $B'$, so that each can have vertical but not lateral motion. On the inner face of the part $B^{28}$ is a rack $B^{29}$ to engage the segment-gear $B^{30}$ on the arm $B^{31}$, which is rigid upon the short shaft $B^{32}$, at the other end of which is rigidly attached the arm $B^{33}$. This short shaft $B^{32}$ is journaled in the part $B^3$, which is a projection of $B'$. The end of the arm $B^{33}$ is provided with a roller $B^{34}$, which rolls on the lower edge of the cam-wheel B. This lower edge is cut out at $B^{35}$, so that when the roller reaches this cut-out portion the arm $B^{33}$ and the roller $B^{34}$ are moved by means of the spring $B^{36}$, so as to throw the part $B^{28}$ downwardly along the dovetailed part of $B'$. The spring $B^{36}$ is shown broken away in Fig. 3; but it can be carried upward and secured to any desired fixed point. The rod $B^{37}$ passes downwardly through the bed-plate A and is provided with an adjustable nut $B^{38}$, whereby the length of the excursion of the arm $B^{33}$ and its associate parts may be limited or regulated. Briefly the action of these several parts is as follows: The wire, properly coiled or reeled above, is drawn down between the rollers, where it is clamped by means of the spring $B^{19}$. The action of the cam in connection with the arm $B^{31}$ is to bring the wire and its associate parts downward the proper distance. The lower projecting end of the wire, such as indicated in Fig. 8, is by this action brought down into the die part below adapted to receive it and hereinafter to be described. The next action of the cam-wheel is to move the arm $B^6$, and this by the action of the two segment-gears rocks the shaft $B^{12}$, and with it the parts which cut off the wire and which will next be described. The further action of the cam is to restore the parts to their original position, leaving the lower portion of the wire which has been cut off in the die below. As the parts travel upwardly the rollers are rotated by means of the rack $B^{27}$, so that the wire is carried downwardly, thus pushing out the piece of wire which has been cut off and feeding down the proper length for the next pivot-piece.

The cutting-off or shearing mechanism is as follows: Projecting from the tubular part $B^{15}$ is the projection $B^{39}$, which carries a hardened piece $B^{40}$, through which the wire passes. This is held in position by the adjustable tubular nut $B^{41}$, and by this means it can be adjusted outwardly as the knife wears. The lower knife consists of a fixed hardened piece $B^{42}$, set in the outer projection $B^{43}$ from the part $B^{28}$. The cutting takes place between these two hardened pieces.

The die which receives the pivot-piece of wire is associated with a slide which carries not only this die but certain other parts hereinafter to be described. Formed upon and laterally-projecting from the standard $A^3$ is the dovetailed piece C, upon which travels the slide $C'$, shaped to receive this dovetailed piece, so that the parts are held in proper relation in their several positions. In Fig. 10 the die about which we are speaking is shown in an enlarged section and looking from the right side of Fig. 1. On the slide $C'$ is the vertically-arranged dovetailed piece $C^2$, on which moves the vertically-sliding part $C^3$. This part $C^3$ is normally in a fixed position, but is capable of vertical adjustment on the dovetailed piece $C^2$. Outwardly projecting from the part $C^3$ is the tubular part $C^4$, within which is secured the tubular piece $C^5$, exteriorly screw-threaded at its lower end and held in position at its lower end by a screw-threaded nut $C^6$. The upper end of the part $C^5$ is enlarged, as indicated at $C^7$, and provided with an annular cap $C^8$, having an opening at its upper central portion, but with a projecting edge adapted to overhang the central die-plate $C^9$, which may also be held in position by the set-screw $C^{10}$. This die-plate is shaped on its upper face in any desired manner—as, for example, as indicated at $C^{11}$—and is provided with a series of perforations, in the case illustrated one central perforation $C^{12}$ for the pivot-wire and eight smaller exterior perforations $C^{13}$ for the pinion-wires. The die-plate $C^9$ is held from rotation. Beneath it is a die of hardened materials $C^{14}$, having a corresponding number of holes. This die part $C^{14}$ is rigidly secured to the tube $C^{15}$, the inner portion of which presents a smooth surface and furnishes a cavity in which slides the rod $C^{16}$, provided on its exterior surface with longitudinal grooves to receive the pinion-wires. This rod is capable of vertical motion. The exterior grooves $C^{17}$ on the rod $C^{16}$ are so deep that the wires can freely lie therein. The rod, with the wires in the grooves, is to be moved upwardly and to carry the wires with it. The devices for accomplishing this result are the following: Fixed on the vertical dovetailed piece $C^2$ is the block $C^{18}$, with an arm $C^{19}$ projecting therefrom and having a bearing at its outer end to receive the tubular piece $C^{20}$, which is rigidly fastened to the rod $C^{16}$ by means of the set-screw $C^{21}$ and the clamp-nut $C^{22}$ at the lower end. On the upper portion of the tubular piece $C^{20}$ are projecting arms, in which are pivoted at $C^{23}$ the levers $C^{24}$. There are just as many of these levers and pivots as there are grooves and wires. At one end of the lever is a spiral spring $C^{25}$, which tends to push the lever outwardly at that end and inwardly at its upper end. The upper ends of these levers are provided each with a finger $C^{26}$, which is opposed to one of the grooves of the rod which at that point is exposed. Each finger therefore rests upon a wire when the parts are in their normal position. The upper end of each lever is provided with a link $C^{27}$, the other end of which is pivoted to the sliding collar $C^{28}$, which surrounds and slides upon the tubular piece $C^{29}$. The collar $C^{28}$ has a groove $C^{30}$ to receive the pins $C^{31}$ $C^{31}$ on the arms of the bifurcated lever $C^{32}$, which is fixed on the horizontal end $C^{33}$ of the lever $C^{34}$. The horizontal portion of this lever is journaled so as to rock in bearings $C^{35}$, secured to the slide $C^{18}$. When the lever $C^{34}$ is moved, the bifurcated lever $C^{32}$ is raised or lowered, and with it the collar $C^{28}$ is moved up and down on the tubular piece $C^{29}$. By rocking the levers $C^{24}$ the finger $C^{26}$ is moved to clamp the wires or release them, according as the motion is up or down. In the event of the action being such as to clamp the wires a further continuation of such action will obviously lift the rod and wires and all these parts together with the tubular piece $C^{20}$.

$C^{36}$ is a projecting part on the slide-block $C^{18}$, and it contains a spiral spring $C^{37}$ and a pin $C^{38}$, which is forced outwardly by such spiral spring and is provided with an exterior pin to engage the outer surface of the tubular piece $C^{20}$. This pin comes to rest on the line $C^{39}$ or in the bottom of the groove $C^{40}$. In the latter case it tends to hold the parts in their normal position, even after the clamping device has released its grip on the wires and rods. When the wires are brought to this elevated position, they are pushed through the die-plate $C^9$, passing through and projecting beyond the holes $C^{13}$ to proper lengths. Here they are united together by molten metal, as hereinafter described, and after this process has been accomplished then they are to be cut off, which is done by the rotation of the die part $C^{14}$. This is effected as follows: On the lower projecting portion of the tubular part $C^{15}$ is a circular enlargement $C^{41}$, from which project the arms $C^{42}$ $C^{42}$, the whole forming a rocking lever. This lever portion is clamped to the tubular part $C^{15}$ by means of the set-screw $C^{43}$. One end of the lever $C^{42}$ normally rests against the end of the adjustable screw-stud $C^{44}$ in the projection $C^{45}$ on the arm $C^{46}$, which is secured to the slide $C^3$. The other end of the lever is adjustably held in position by the spiral spring $C^{47}$, one end of which is attached to the lever and the other end to the pin $C^{48}$ on the slide $C^3$. The circular enlargement $C^{41}$ rests upon the adjustable collar $C^{49}$, the lower end of which is screw-threaded into an opening in the arm $C^{50}$, which is secured to the part $C^3$ and provided with the set-screw $C^{51}$, whereby the parts are fixed in position. By this means the lever is held in a horizontal position and the die $C^{14}$ up against the under surface of the die-plate $C^9$.

$C^{52}$ is an arm loosely journaled on the part $C^{33}$. On one end of the lever $C^{42}$ is a block $C^{53}$, and secured upon its upper portion is a flat spring $C^{54}$, which projects beyond the end of the block. To the block $C^{53}$ is secured the finger $C^{55}$ by a mortise-and-tenon joint, the pin of which is shown at $C^{56}$. The flat spring $C^{54}$ overlies the upper part of this finger and keeps it normally in a horizontal position and prevents it from rocking downwardly; but concentric with the pivot $C^{56}$ its upper edge is cut off at $C^{57}$, so as to permit the finger to be forced upwardly against the action of the flat spring $C^{54}$. The blunt end of the finger $C^{55}$ lies in the path of the upper end of the arm C$^{52}$. This arm C$^{52}$ has a laterally-projecting part C$^{58}$, which overhangs a projecting part C$^{59}$ on the lever C$^{34}$. The lever C$^{34}$, as previously described, is moved to the right, as indicated in Fig. 12, to clamp and raise the wires. By moving it in the opposite direction it will move a certain distance, releasing the wires before the arm C$^{59}$ engages the part C$^{58}$, and when this latter engagement takes place then a further continuation of this motion will bring the arm C$^{52}$ against the end of the finger C$^{55}$, in which position they are indicated in Fig. 12. A further continuation of this motion will rock the lever C$^{42}$, and with it the several parts, up to the die C$^{14}$ and cause it to rotate slightly and cut off the pinion-wire. A further continuation of this motion will ultimately cause the end of the arm C$^{52}$ to free itself from the end of the finger C$^{55}$ and allow the lever to be restored by the action of the spring C$^{47}$ to its normal position. When subsequently the movement of the lever C$^{34}$ is reversed, the upper end of the arm C$^{52}$ will pass under the finger C$^{55}$, which latter springs up and is then thrown down into normal position by the flat spring C$^{54}$. The arm C$^{52}$, which is loose on the part C$^{33}$, is restored to its normal position by the spring C$^{60}$.

Referring again to Figs. 10 and 11, the part C$^{15}$ is provided with two longitudinal apertures C$^{61}$, which receive the upwardly-projecting fingers C$^{62}$ C$^{62}$ on the tubular piece C$^{29}$, so that these two parts are capable of longitudinal motion one on the other, but will rotate together. The action of these several parts is to feed upwardly the pinion-wires to cut them off at the proper length. The feeding is first done. The molding or casting of the metal about the wire to connect them together and join them with the pivot-wire is then done as hereinafter described, and the cutting-off process is then carried out to complete the operation.

The pivot-pin previously referred to as fed down and cut off by mechanism illustrated in Fig. 8 remains in the die-plate C$^{9}$, and the action of the parts which is described is to assemble and hold in proper relation to and about this pivot-pin the several pinion-wires. The operation of setting the pivot-pin is performed when the parts are at the extreme right. The operation of feeding upward the pinion-wires is performed when the parts are in the position indicated in Fig. 1, the slide having moved toward the left and away from its position at the extreme right. This sliding motion is effected by means of the rack D at the bottom of the slide C′, which rack is engaged by the pinion D′, associated with the friction-disk D$^{2}$, keyed to the shaft D$^{3}$, which shaft is journaled in the piece A$^{3}$. This shaft has a bevel-pinion D$^{4}$, which meshes with a crown-pinion D$^{5}$ on the shaft A$^{8}$. The shaft D$^{3}$ at its other extremity carries a bevel-pinion D$^{6}$. The pinions D$^{4}$ and D$^{6}$ are both loose on the shaft D$^{3}$, but have clutch-faces to work in connection with the sliding clutch D$^{7}$, which is feathered to the shaft D$^{3}$ and carried at the lower end of the rock-bar D$^{8}$, which is pivoted on the arms D$^{9}$ D$^{9}$ from the standard A$^{3}$. Pivoted on the pivot-pin D$^{10}$ is an elbow crank-lever D$^{11}$, which has a pin D$^{12}$ at its angle, and this pin projects into the slot D$^{13}$ in the rock-bar D$^{8}$. The other end of the elbow crank-lever D$^{11}$ carries a pin D$^{14}$, which projects into the cam-groove D$^{15}$ on the cam-wheel D$^{16}$, which wheel is mounted on the shaft A$^{8}$, so as to rotate therewith. On the upper end of the rock-bar D$^{8}$ is a vertically-adjustable head D$^{17}$ with inclined faces and a central depression, into which depression fits the pin D$^{18}$, which is downwardly thrust by the spiral spring D$^{19}$. The crown-pinion D$^{5}$, previously referred to, is attached to a hub at the upper end of which is a bevel-gear D$^{20}$, which engages the pinion D$^{6}$. The pinions D$^{20}$ and D$^{5}$ are rigid together, but free on the shaft A$^{8}$. They are also rigid with the pinion D$^{21}$, which is also loose on the shaft A$^{8}$. It meshes with the pinion D$^{22}$, journaled on the pin D$^{23}$, which pin is supported on a flange A$^{6}$. At the other end of the pin D$^{23}$ is the pinion D$^{24}$, which meshes with the pinion D$^{25}$, which is rigid on and rotates with the shaft A$^{8}$. As the cam-wheel D$^{16}$ rotates the pin D$^{14}$ travels in the groove D$^{15}$, and thus rocks the elbow crank-lever D$^{11}$, carrying with it the pin D$^{12}$, which pin, in turn, when carried one way slightly moves the rock-bar D$^{8}$ in the same direction and when moved in the opposite direction carries it with it. The operation of the elbow crank-lever D$^{11}$ is such as to move the rock-bar D$^{8}$ far enough to force the pin D$^{18}$ out of the depression and let its point travel down the inclined top of the adjustable head D$^{17}$, and thus the rock-bar D$^{8}$ is pushed far enough to one side or the other to cause its clutch D$^{7}$ to engage with the clutch-surface on the pinion D$^{6}$ or D$^{4}$, as the case may be. The cam-groove D$^{15}$ is so adjusted that when the sliding frame C′ is at its extreme motion to the right the pinion D$^{4}$ will be thrown into operation to move the sliding frame C′ and its associated parts quickly toward the left to the position indicated in Fig. 1. The cam-groove is further constructed so that as the cam rotates the pinion D$^{6}$ will be successively thrown into operation for two movements, first to move the sliding frame one step toward the right and then to move it to its extreme position toward the right, referring to Fig. 1, and these steps follow each other in regular succession during the operation of the machine. At the end of each step or movement the cam operates to restore the parts to their position of rest, as indicated in Fig. 5, and during a continuation of such condition the sliding frame C′ remains at rest in whatever position it may be. In such position of rest the sliding frame C′ is locked by the following means: E E are hard-metal blocks set into the rear surface of the sliding frame or carriage C', and each provided with a removable socket-piece E' E'. $E^2$ is a pin adapted to fit into said socket and pivoted at its outer end to the elbow crank-lever $E^3$. This pin is placed in an aperture through the standard $A^3$, which is capped at $E^4$. Within the aperture is a spiral spring $E^5$ and the bushing $E^6$, and there is a pin $E^7$ through the pin $E^2$. This spiral spring tends to force the pin out into the socket and lock the parts in position. The elbow crank-lever is pivoted at $E^8$ and its other end is provided with a pin $E^9$, opposed to a cam-wheel $E^{10}$ on and rotating with the shaft $A^8$. This cam-wheel can be adjusted in its position and secured by means of the set-screw $E^{11}$. It carries three cam-spaces $E^{12}$ $E^{13}$ $E^{14}$. These cams are so shaped and related to each other as that the pin is retracted after each operation, and when the parts are brought to the position where a new operation is to begin the pin is permitted to pass forward into the socket and lock the parts in rigid relation for the time being.

Referring again to Fig. 1, after having described the mechanism by which the sliding frame C' is moved from its position at the extreme right quickly to the position shown in Fig. 1, and bearing in mind that at this point the mechanism heretofore described, and shown in detail in Figs. 10, 11, and 12, contains in proper relation to each other the pivot and pinion wires, I will proceed to describe the mechanism whereby these parts are secured together by bringing them into the mold, which is then filled with molten metal. In the upper portion of the standard $A^3$ is a slot F, in which slides the block F'. On the front side of the standard $A^3$ and in front of this slot or opening F is secured the facing-block $F^2$, to which are secured the outer plates $F^3$ $F^3$. These plates overhang the flanges $F^4$ on the sliding block F', and thus the block is held in position while it is free to slide vertically. The outer end of the sliding block F' is formed into a cylinder $F^5$, which contains a tube $F^6$, in which moves a plunger $F^7$, surrounded at its upper end by the spiral spring $F^8$, which tends to keep the plunger at the upward limit of its excursion. The tube $F^6$ is provided with the adjustable cap $F^9$, which determines the limit of the upward movement of the plunger. $F^{10}$ indicates set-nuts, whereby the tube $F^6$ is held in position. It is provided with a lower enlargement $F^{11}$, which bears against the shoulder $F^{12}$. In this lower enlargement is formed the upper mold-piece $F^{13}$, which is apertured to form a space for the molten metal and has also an upper aperture to receive the lower end $F^{14}$ of the plunger. This lower end of the plunger has a cavity $F^{15}$ to receive the upper end of the pivot-pin. At the lower end of the mold-piece is an aperture $F^{16}$ for the admission of the molten metal to the inner molding-chamber. This aperture is associated with two hinged jaws $F^{17}$, which are pivoted at $F^{18}$ and controlled each at its upper end by a spring $F^{19}$. The upper end of each spring is secured to one of the extended arms of a cross-bar $F^{20}$. These spiral springs tend to keep the jaws closed, as indicated in Fig. 1; but in this position they leave a slight opening $F^{21}$, through which the metal can be introduced. The cross-bar $F^{20}$ is rigidly mounted on the plates $F^3$, but extended therefrom by means of the posts $F^{22}$, so as to leave room between the cross-bar $F^{20}$ and the inner portions of the machine for the cylindrical part $F^5$ to rise. Downwardly depending from the cross-bar $F^{20}$ are fingers $F^{23}$. Thus when the parts are in the position shown in Fig. 1 the metal can be introduced, as hereinafter described, to fill the mold, and thus hold the pivot-pin and pinion-wires in proper relation at the upper ends. After this operation is performed the cylindrical portion $F^5$ should rise to free the parts. On the inner end of the sliding block F' is a roller $F^{24}$, acted upon by the cam projections $F^{25}$, $F^{26}$, and $F^{32}$ on the cam-wheel B. As the cam-wheel B rotates with the shaft $A^8$ the cam-surfaces will successively engage the roller $F^{24}$, so as to move the sliding block F' vertically at the right time and to the right degree to cause it to perform the necessary excursions. Upwardly projecting from the block F' is a rod $F^{27}$, which carries the piston $F^{28}$ within the cylinder $F^{29}$, which cylinder is supplied, by means of the valve $F^{30}$, with compressed air from any desired source. The cylinder is mounted on the standard $F^{31}$. The compressed air tends to hold the block F' and the cylinder $F^5$ down in the position shown in Fig. 1. It is desirable to have more or less of the cushion or elastic effect in its operation in connection with the lower portions of the mold.

Referring now to Fig. 5, the action of the first cam to be encountered by $F^{24}$ will be to raise the block F' and the cylinder $F^5$ away from the lower cylinder $C^4$ and its associated parts. Since the molten metal has been run into the parts associated with the cylinder $F^5$, when the latter rises it will carry such molten metal, the pivot-wires, and the pinion-wires in assembled relation upwardly. As this motion progresses the jaws $F^{17}$ encounter the fingers $F^{23}$ and the action of the spring $F^{19}$ is overcome and the jaws opened. This exposes the sprue on the outside of the upper molding-cylinder and it comes into contact with the lower end of the rod G. This rod G is guided at G' and at $G^2$. Its upper end is secured to the bent rod $G^3$, which is turned downwardly and attached to the lever $G^4$ by means of the link $G^5$, which passes through the rod $G^3$ and bears against the upper end of a spiral spring $G^6$ on such rod, the lower end of which is held in position by the bearing $G^7$. A bearing $G^8$ is also provided for the rod $G^3$. Thus the connection between the rod $G^3$ and the lever $G^4$ is an elastic or yielding connection. The lever $G^4$ is pivoted at $G^9$, and its other end is provided with a pin $G^{10}$, which travels in the path of the cam $G^{11}$ on the cam-wheel B. By the action of this cam the rod $G^3$ is drawn downwardly, and the lower end of the rod G strikes and knocks off the sprue. After the cam passes the spring $G^6$ will restore the parts to their original positions. At this point the action of the cam which controls the sliding carriage is such as to move the sliding carriage $C'$ and its associated parts to the right one step, so as to bring the disk-molding die into position beneath the cylindrical part $F^5$. I will now describe this disk-molding die. J is a sliding block vertically adjustable on the guide $J'$, which is formed on the slide $C'$. The block J has at its outer end a cylindrical portion $J^2$, which contains the tubular part $J^3$, screw-threaded at its lower end and provided with a nut $J^4$ to hold it in proper position. The tubular part also has a flange $J^5$ to engage the upper end of the cylindrical portion $J^2$. This tubular part also has a smaller upwardly-extending tubular portion $J^6$, which is surrounded by the sliding collar $J^7$. A spiral spring $J^8$ is interposed between the two parts and tends to keep the collar $J^7$ at its upper limit of motion. Within the part $J^6$ is a hard-metal die portion $J^9$, with suitable apertures therein to receive the several pinion and pivot wires. Just above this hardened portion is placed a zinc washer $J^{10}$. These may be fed by machinery or by hand; but in the present machine I have assumed that these washers would be fed into this cavity prepared for them by hand one at a time. Assuming now that the parts are in position where the cylinder $J^2$ is beneath the cylinder $F^5$, the further rotation of the cam-wheel B will bring into engagement with the roller $F^{24}$ the cam $J^{11}$, which will force the block $F'$ and cylinder $F^5$ downwardly and drive the several pivot and pinion wires through the zinc washer and into the cavities in the hard-metal piece $J^9$, and thus the disk is secured in position on the several pivot and pinion wires and holds their free ends together. The continued rotation of the shaft $A^8$ causes another cam to engage the roller $F^{24}$ and raises the cylindrical part $F^5$, which again carries with it the assembled parts of the pinion. Immediately thereafter the carriage is again moved to its extreme position to the right, referring to Fig. 1, and here the cylindrical part $C^4$ is brought beneath the devices for feeding the pivot-wire and that operation will again occur. This last motion, however, brings the lower mold into position under the cylinder $F^5$, and I will now describe this lower mold and its associated parts. K is a sliding block adjustable on the dovetailed part $K'$ on the carriage $C'$. This block K carries an outer cylindrical portion $K^2$, with a tubular part $K^3$ therein. This tubular part has an enlarged head $K^4$, with a mold-block $K^5$ therein. This block is provided with a suitable cavity to form a second casting. $K^6$ is a washer which may be placed in the upper cavity fitted for that purpose in the enlarged head $K^4$ and which is designed to keep the metal from running into the spokes or open places of the wheel. $K^7$ is a gear-wheel which is to be incorporated with the other assembled parts. It is placed in the cavity in the upper part of the cylindrical portion $K^2$, which serves to hold it in position, as shown in Fig. 15. $K^8$ is the aperture through which the metal is introduced and in which the sprue is formed. $K^9$ is a plunger within the tubular part $K^3$. This tubular part is held in position by the nut $K^{10}$ and is provided with a screw-cap $K^{11}$, which abuts upon a set-nut $K^{12}$. The plunger $K^9$ projects outwardly through this screw-cap and the spiral spring $K^{13}$, the lower end of which engages a washer $K^{14}$ on the lower end of the plunger. The tendency of the spiral spring is to hold the plunger down at its lowest point. The arrangement of parts is such as to permit the plunger to be adjusted as to the limits of its excursion. The pin $K^{15}$ projects outwardly from the plunger and through a slot $K^{16}$. It is provided with a rod $K^{17}$, which projects upwardly through a hole and emerges at the lower surface of the cavity $K^8$. After the cylinder $K^2$ has been brought into position under the cylinder $F^5$ the next action of the cam-wheel B is to again depress the cylinder $F^5$, and the parts of the pivot and pinion wires project down into the molding-cavity of the lower mold and through the central cavity of the wheel. The disk is intended to come into close proximity to or perhaps to abut against the upper surface of the gear-wheel. The molten metal is now run into the lower mold, whereupon the cavity is filled and the central aperture in the gear-wheel is filled up to the disk, or if the washer be slightly above the gear-wheel then the metal runs out and forms a little disk of molten metal between the washer and the upper surface of the gear-wheel. Of course the metal used in these molding processes is such as will promptly harden. A modification of these features is illustrated in Figs. 10 and 16, where a construction is shown which obviates the necessity of the use of the washer $K^6$. In either case the upper head is cut away at $K^{18}$ to permit of the easy approach of devices for supplying the molten metal. The upper head $K^4$ in the devices shown in Figs. 16 and 17 is cut out, so as to leave elevations $K^{10}$ $K^{19}$ to fit the spaces between the spokes, and in this way the wheel when dropped into position will fall into a position where one of the spokes, or, in other words, a continuous surface of the metal of the gear-wheel, lies above the metal-supply aperture $K^8$, and thus the need of the washer $K^6$ is obviated. The work has now been completed and it only remains to remove the finished product from its position in the mold. One of the cams on the wheel B now encounters the roller $F^{24}$ and begins to raise the cylindrical portion $F^5$. Before it has risen its central rod $F^7$ is engaged at its upper end by the lower end of the rod M, which is surrounded by a spiral spring M', which tends to keep it in its upper position. This rod M is secured at its upper end to the lever $M^2$, pivoted at $M^3$, and adapted at its other end, $M^4$, to be engaged by the cam $M^5$, which is driven by the worm-gear $A^9$. The lever $M^2$ is prevented from rocking by the fact that its outermost extremity $M^6$ moves in a slot $M^7$ in the upper end of an extension $M^8$, which is mounted on the upper end of the shaft $A^8$; but not so as to rotate therewith, and serves as a guide to allow the lever $M^2$ to rock vertically, but not to move laterally. This action is timed so that at the moment when from this last position the cylindrical part $F^5$ tends to rise the plunger $F^7$ is held for the moment in position, thus pushing the finished product out of the upper mold and permitting the cylindrical part $F^5$, with its associated parts, to move away from and leave the completed pinion in position in the lower mold. The next operation of the several parts is to move the sliding carriage C' back to the position shown in Fig. 1, it being understood that the first-described operation of pushing down and cutting off the pivot-wire has been performed. On the shaft $A^{24}$ is a cam N, adapted to engage the roller N' on the end of the lever $N^2$, which is pivoted at $N^3$ on the arm $N^4$. The end of the lever $N^2$ is secured to the lower end of the rod $N^5$, which passes up through the bed-plate A and through the guide $N^6$. This rod carries the nut $N^7$ and spiral spring $N^8$, which tends to keep the rod down at the limit of its outer motion. Its downward motion is limited by the collar $N^9$. Secured to the collar is the arm $N^{10}$, which carries the collar $N^{11}$, with the upwardly-projecting finger $N^{12}$. The upper end of the rod $N^5$ projects into close proximity to the lower end of the plunger $K^9$, and as the parts are moved up by the action of this cam the upper end of the rod $N^5$ engages the lower end of the plunger $K^9$ and moves it up slightly, so as to loosen the completed pinion from the head $K^4$ and mold $K^5$. Immediately after this loosening has taken place the finger $N^{12}$ engages the block $N^{13}$, which carries an arm $N^{14}$, at the outer extremity of which is a pair of jaws $N^{15}$, which are adapted to grasp the pinion just below the first cast metal. The block $N^{13}$ is locked in position by a pin $N^{16}$, which passes into a depression in the side of the block. This pin is elastically forced toward the block by means of a spring $N^{17}$, bearing against the pin $N^{18}$ and the fixed bearing $N^{19}$. On the rod $N^{10}$ above the washer $N^{11}$ is a spiral spring $N^{20}$, which when the block $N^{13}$ is thus free forces it up against the collar $N^{21}$. This sudden and relatively extended motion of the block $N^{13}$ carries with it the arm $N^{14}$ and the jaws $N^{15}$ and lifts the pinion out, where it is held by the jaws until the return of the carriage C'. The further action of the parts will restore all these parts to their normal positions, except that the jaws being in their normal position still hold the pinion. When the carriage returns to this position, it will force the pinion away from the jaws and leave them in position where they will engage the next pinion. When forced from the jaws, the pinions fall upon the table A or in any receptacle placed to receive them. The pinion-wires are shown in Fig. 1 as they are being fed up, and they may be indicated by the letter O.

I will now describe the apparatus for supplying the molten metal for the several molding processes.

On the shaft $A^{24}$ is the cam P, provided with a groove P' to receive the roller $P^2$ on the bottom of the slide $P^3$, which slide is provided with upward posts $P^4$, on which is carried the metal-pot $P^5$. The operation of the cam P is to reciprocate this slide to and from the point where the metal-pot supplies the metal for the casting.

$P^6$ is a screw journaled at $P^7$ and provided with a crank $P^8$ and adapted to adjust the base $P^9$, on which the posts $P^4$ are mounted. By this means the pot can be adjusted along the slide $P^3$ and fixed in any desired position. Under the pot is a burner $P^{10}$, though of course any other sort of device for heating could be used. In the upper part of the pot is a metal-chamber $P^{11}$, with a secondary $P^{12}$, in which the metal about to be used is contained. This chamber is tapered above so as to form a cylinder $P^{13}$, in which moves the plunger $P^{14}$, the plunger having a small way $P^{15}$, whereby when it is at its upward position the molten metal in the chamber $P^{11}$ will pass through the plunger into the lower chamber $P^{12}$. When the piston descends, this supply-way is cut off and the metal is therefore forced out through the small passage-way $P^{16}$, which is arranged so as to register with the proper parts to discharge the molten metal. Another associated passage-way leads up to approximately the same point to discharge hot gas to the point where the molten metal is being discharged into the molds to keep the parts properly heated and the metal in a proper molten condition.

Mounted above the metal-pot is the rock-bar $P^{18}$, pivoted at $P^{19}$ and connected at $P^{20}$ with a link $P^{21}$, the lower end of which is attached to the plunger. The other end of the rock-bar $P^{18}$ passes between the guides $P^{22}$ and is associated with the set-bolt $P^{23}$, which limits its downward motion. It is attached, by means of the coupling $P^{24}$, to the upper end of the rod $P^{25}$, which passes down through the bearing $P^{26}$ and is surrounded by the spiral spring $P^{27}$, the lower end of which bears upon the adjustable collar $P^{28}$. This spiral spring tends to force the rod $P^{24}$ and plunger down to the limit of their lower motion. The rod $P^{25}$ is extended below the bedplate A and is engaged by the cam-wheel $P^{29}$, which tends at the proper moment to drop the plunger and immediately raise it.

The use and operation of my invention have probably been sufficiently described in the course of the foregoing description of the machine; but I will briefly review the general operation of the machine. The machine is automatic in the sense that its several operations are carried out by a continuous operation, it only being necessary to feed the machine proper, and in this way a large number of such completed wheels or pinions may be produced from the wire, the molten metal, and blanks and wheels, which are preferably stamped out in the ordinary manner. The pivot-wire may come from a roll and be fed down into the pivot-feeding device. Here by the mechanism previously described it is carried down, and when the moving carriage is at the extreme right the pivot-wire is fed down into the assembling device below, and here it is cut off to the proper length and retained in the assembling device. This assembling device, as previously described, has feeding up from below a series of wires which are destined to form the pinion-wires or the pinion-teeth of the lantern-pinion; but these wires are not fed forward in this position. It will be understood, of course, that the other operations are going on at the same time, or at least some of them; but so far as the formation of the pinion which is produced by the machine is concerned we will follow through the several operations for the formation of this single pinion. The carriage now moves quickly to the limit of its excursion toward the left, which brings the assembling device directly beneath the upper mold portion. While in this position the pinion-wires are fed upwardly, as described, and cut off in due time to the proper length. The pot of molten metal moves forward and is operated so as to discharge into the upper mold a quantity of molten metal which immediately hardens about the pinion-wires and pivot-wire and holds them all together. They remain in the upper mold, which now rises so as to free itself and the assembled parts from the assembling device, and the carriage now moves backwardly or toward the right about half its full excursion. This brings the disk-holding device under the upper mold, which now descends, driving the ends of the several pinion and pivot wires through the disk, which is preferably of metal, such as zinc, which will permit this action, and thus is attached to the assembled parts a device for holding the several parts together at their free ends and a device for preventing the flow of the metal into or among the pinion-wires. These parts now again separate and the carriage moves to the limit of its excursion toward the right, bringing the lower mold beneath the upper mold. The parts then come together, and the lower mold is filled with metal, which results in applying a securing mass of metal about the gear-wheel which lies in the upper part of the lower mold, the pinion and pivot wires, and the zinc disk. This completes the apparatus. It will be borne in mind, of course, that after the zinc disk is placed in position the upper mold rises before the parts move, so as to clear the assembled parts from the moving carriage. The parts are so arranged and their several motions timed that after this last molding process and when the pinion is completed the upper mold rises, but discharges the completed pinion and does not carry it upwardly. When the parts have been freed, the lower mold devices operate to punch or thrust the finished wheel upwardly, whereupon it is lifted out of its socket in the lower mold and the parts all move to the initial position.

It will be understood, of course, that the various portions of my device could be used without the others or in connection with other features greatly modified. It will also be understood that cams and arrangements of levers and other such operating parts could be greatly modified without departing from the spirit of my invention. In short, I do not wish to be understood as limiting myself to one particular form, arrangement, and grouping of these several features, elements, or parts; but I have presented here that form of a machine which I am now using with the intention of having it taken in a sense as diagrammatic or descriptive of that class of machines which could be produced and any one of which would contain the substance of all or most of my invention.

I claim—

1. In a machine for forming pinions, an upper mold portion comprising a movable part with a mold in its lower end and a cam for intermittently raising such mold, and a counteracting device against which such part is moved, said counteracting part consisting of a piston and air-cylinder.

2. In a machine for forming pinions, an upper mold device comprising a movable part provided with a mold in its lower end, and movable jaws which control the opening of such mold, and means actuated by the movement of the movable part for opening such jaws when the mold has performed its function.

3. In a machine for forming pinions, an upper mold device comprising a movable part provided with a mold in its lower end, and movable jaws which control the opening of such mold, means actuated by the movement of the movable part for opening such jaws when the mold has performed its function, and means for moving such movable part.

4. In a machine for forming pinions, an upper molding part comprising a moving portion with a mold and passage-way leading to said mold, a sprue-removing device consisting of a rod in the path of the moving portion, and means for moving said rod in opposition to the motion of the part which contains the mold.

5. In a machine for forming pinions, the combination of a movable mold, movable jaws associated with such mold and forming a sprue-hole therefor, a rod in the path of such mold, means for moving the mold, and means for opening the jaws so that the sprue will be brought against the rod.

6. In a machine for forming pinions, an upper molding part comprising a moving portion with a mold and passage-way leading to said mold, a sprue-removing device consisting of a rod in the path of the moving portion, and means for moving said rod in opposition to the motion of the part which contains the mold, and jaws which control said passage-way and open to expose the sprue.

7. In a machine for forming pinions, the combination of a holder for the pinion and pivot wires and an upper mold, means for moving the two so that one approaches the other and the wires are included in the mold-chamber, a movable pot and means for bringing it to the holder and upper mold when they are together so as to fill the mold with molten metal to permanently assemble and unite such wires.

8. In a machine for forming pinions, the combination of a wire-holding device to hold the pivot and pinion wires, means for moving the same transversely to the length of the wires, an upper molding device adapted to move in the direction of the length of the wires, said upper molding device containing a chamber to receive the said wires freely, and means for supplying metal to such molds to unite and secure the several wires together.

9. In a machine for forming pinions, the combination of a wire-holding device to hold the pivot and pinion wires, means for moving the same transversely to the length of the wires, an upper molding device adapted to move in the direction of the length of the wires, said upper molding device containing a chamber to receive the said wires freely, and means for supplying metal to such molds to unite and secure the several wires together, said upper mold adapted to retain and to lift the assembled parts out of the wire-holder.

10. In a machine for forming pinions, the combination of a wire-holding device with an upper molding device and a metal-supply device, and means for moving each of them and bringing them together.

11. In a machine for forming pinions, the combination of a wire-holding device with an upper molding device, a metal-supply device, said devices arranged to move together, and means for moving each of them so as to bring them together.

12. In a machine for forming pinions, the combination of a wire-holding device with an upper molding device and a metal-supply device, and means for moving each of them and bringing them together, said upper mold adapted to move longitudinally of the wires.

13. In a machine for forming pinions, the combination of a wire-holding device with an upper molding device and a metal-supply device, and means for moving each of them in a different direction so as to bring them together.

14. In a machine for forming pinions, the combination of a wire-holding device adapted to hold the pivot and pinion wires, with means for moving it transversely of the length of said wires, an upper mold-forming device adapted to move longitudinally of the length of the wires and toward the holder, and a metal-supply device adapted to move transversely so that the three devices come together at the same point.

15. In a machine for forming pinions, the combination of a wire-holding device adapted to hold the pivot and pinion wires, with means for moving it transversely of the length of said wires, an upper mold-forming device adapted to move longitudinally of the length of the wires and toward the holder, a metal-supply device adapted to move transversely so that the three devices come together at the same point and devices connected with a single driving-shaft to bring the several parts to their proper positions.

16. In a machine for forming pinions, the combination of a wire-holding device adapted to hold the pivot and pinion wires, with means for moving it transversely of the length of said wires, an upper mold-forming device adapted to move longitudinally of the length of the wires and toward the holder, a metal-supply device adapted to move transversely so that the three devices come together at the same point, devices connected with a single driving-shaft to bring the several parts to their proper positions, and an automatic locking device to hold the wire-holding device in position during the casting.

17. In a machine for forming pinions, the combination of a wire-holding device adapted to hold the pivot and pinion wires, with means for moving it transversely of the length of said wires, an upper mold-forming device adapted to move longitudinally of the length of the wires and toward the holder, a metal-supply device adapted to move transversely so that the three devices come together at the same point, devices connected with a single driving-shaft to bring the several parts to their proper positions, an automatic locking device to hold the wire-holding device in position during the molding, and means for raising the upper mold-forming device and for lifting with it the assembled parts.

18. In a machine for forming pinions, a lower mold comprising a part with a suitable cavity, a recess for holding the gear-wheel and a sprue-hole in such part forming a passageway into the mold.

19. In a machine for forming pinions, a lower mold comprising a part with a suitable cavity, a recess for holding the gear-wheel, a sprue-hole in such part forming a passageway into the mold and a plunger adapted to move upwardly and force the completed wheel out of such die.

20. In a machine for forming pinions, a lower mold comprising a part with a suitable cavity, a recess for holding the gear-wheel, a sprue-hole in such part forming a passageway into the mold, a plunger adapted to move upwardly and force the completed wheel out of such die and a rod adapted to move upwardly to push out the sprue.

21. In a machine for forming pinions, a lower mold comprising a die with a suitable cavity, a recess for holding the gear-wheel, a passage-way into the mold, a plunger adapted to move upwardly and force the completed wheel out of such die, and a rod attached to said plunger and adapted to push out the sprue.

22. In a machine for forming pinions, a mold-piece having a mold-cavity to form the casting at the gear-wheel end of the pinion and adapted to hold a gear-wheel, a second mold-piece to hold the assembled parts at the other end of the pinion, and means for reciprocating one of such mold-pieces toward the other.

23. In a machine for forming pinions, a mold-piece having a mold-cavity to form the casting at the gear-wheel end of the pinion and adapted to hold a gear-wheel, a second mold-piece to hold the assembled parts at the other end of the pinion, means for reciprocating one of such mold-pieces toward the other, and a metal-supply device adapted to be moved toward such mold-pieces when they are in operative position.

24. In a machine for forming pinions, the combination of a pinion-wire-feeding device with a pivot-wire-feeding device, an upper molding device, a lower molding device, a metal-supply device and a zinc-washer-holding device, with means for successively bringing them into proper relation to each other.

25. In a machine for forming pinions, the combination of an assembling device, wire-feeding devices adapted to feed wires into the assembling device in relations proper to the finished pinion, means for disengaging such assembling device and one of the feeding devices so as to leave the wires at one end of the pinion exposed, a mold and means for bringing such mold and the assembling device into operative position so that the wires are included in the cavity of the mold, and means for filling such cavity with molten metal.

26. In a machine for forming pinions, a support, a movable carriage, an assembling device on the carriage, a wire-feeder associated with the assembling device to feed wire into one end of it, a feeder on the support to feed wire into the other end, a mold on the support, and means for moving the carriage so as to move the assembling device from the feeding device into operative position with respect to the mold.

27. In a machine for forming pinions, the combination of a mold for fastening together the wires at one end of the pinion and adapted to hold the assembled parts, with a second mold device to fasten together the parts at the other end of the pinion, and means for moving the mold devices into operative relations with respect to each other.

28. In a machine for forming pinions, the combination of an assembling device to hold the wires in relation proper to the finished pinion, a mold to secure together the wires at one end of the pinion, means for disengaging such devices so that the assembled parts are retained in the mold device, a second mold device for securing together the parts at the other end of the pinion, and means for bringing the unfinished pinion and such second mold device into operative relations with respect to each other.

29. In a machine for forming pinions, the combination of a support, a mold and holding device on the support to secure together the wires at one end of the pinion, a carriage movable thereacross, an assembling device to hold the pinion and pivot wires in their proper relations, a second mold for securing together the part at the other end of the pinion, and means for moving the carriage so that the assembling device and the second mold device are successively brought into and out of operative relations with respect to the mold and holding device.

30. In a machine for forming pinions, the combination of an assembling device, means for feeding the pinion and pivot wires into such device in their proper relation, a mold to secure the wires together at one end of the pinion and to retain the parts in their assembled relations thereafter, means for disengaging the assembling device and such mold device, a mold apparatus for securing the parts together at the other end of the pinion, and means for moving the unfinished pinion and the second molding device with respect to each other so that the unfinished end of the pinion is brought into position in such mold.

ANDREW H. NEUREUTHER.

Witnesses:
EDWARD B. BIRKENBEUEL,
A. J. JOHNSON.